US012734865B1

(12) United States Patent
Xia

(10) Patent No.: US 12,734,865 B1
(45) Date of Patent: Sep. 15, 2026

(54) PICKUP TRUCK BED ROLLING COVER AND SIDE RAIL STRUCTURE THEREOF

(71) Applicant: Foshan Baitai Auto Accessories Co., Ltd, Foshan (CN)

(72) Inventor: Yong Xia, Foshan (CN)

(73) Assignee: Foshan Baitai Auto Accessories Co., Ltd, Foshan (CN)

( * ) Notice: Subject to any disclaimer, the term of this patent is extended or adjusted under 35 U.S.C. 154(b) by 0 days.

(21) Appl. No.: 19/305,689

(22) Filed: Aug. 20, 2025

(30) Foreign Application Priority Data

Aug. 6, 2025 (CN) ......................... 202521670909.8

(51) Int. Cl.
*B60J 7/06* (2006.01)

(52) U.S. Cl.
CPC .................................... *B60J 7/068* (2013.01)

(58) Field of Classification Search
CPC ........ B60J 7/041; B60J 7/0084; B60J 7/0573; B60J 7/02; B60J 7/047; B60J 7/062; B60J 7/102; B60J 7/1204; B60J 7/068; B60J 7/141; B60J 7/085; B60J 7/198; B60J 7/1607; B60J 7/057; B60J 11/02
USPC ...... 296/98, 100.03, 100.04, 100.05, 100.09, 296/100.12, 136.03
See application file for complete search history.

(56) References Cited

U.S. PATENT DOCUMENTS 4,210,361 A * 7/1980 Marvin .................... B60J 7/068 296/100.09
5,040,843 A * 8/1991 Russell ................... E06B 9/581 296/100.09
5,058,652 A * 10/1991 Wheatley ................. B60J 7/104 296/100.18
5,275,458 A * 1/1994 Barben .................... B60J 7/104 296/100.18
6,113,176 A * 9/2000 Bernardo ................. B60J 7/041 296/100.09
6,126,226 A * 10/2000 Wheatley ................. B60J 7/104 296/100.01
6,276,735 B1 * 8/2001 Champion .............. B60R 11/06 296/100.1

(Continued)

FOREIGN PATENT DOCUMENTS

CN 112009222 A * 12/2020 .............. B60J 7/085

OTHER PUBLICATIONS

Translation of CN 112009222 (Year: 2020).*

*Primary Examiner* — Amy R Weisberg
*Assistant Examiner* — Veronica M Condo

(57) ABSTRACT

A pickup truck bed rolling cover and its side rail structure are provided, including a side rail body, which includes a profile rail and a single-layer plate extending outward therefrom. An outer edge shape of the single-layer plate matches a mounting contour of a pickup bed, with a sealing strip at an edge of the single-layer plate. The rolling cover includes two symmetrical side rail structures, one end of which is provided with a cover plate. A roller shutter box below the cover plate is mounted on the side rail structure and the plate, and houses a roller shutter. The roller shutter slides along the side rail structures, and a tailgate sheet is provided at an end of the shutter. After the entire side rail structure is installed on the bed, a consistent front-rear gap is achieved, and the overall loading visual effect matches that of the original accessories.

10 Claims, 13 Drawing Sheets

(56) References Cited

U.S. PATENT DOCUMENTS

| | | | | |
|---|---|---|---|---|
| 7,537,264 | B2 * | 5/2009 | Maimin | B60P 7/02 296/100.09 |
| 9,211,833 | B2 * | 12/2015 | Rusher | B60J 7/085 |
| 9,834,076 | B2 * | 12/2017 | Rohr | B60J 7/067 |
| 10,112,464 | B2 * | 10/2018 | Koengeter | B60P 7/02 |
| 11,040,605 | B2 * | 6/2021 | Bernardo | B60J 7/068 |
| 11,180,011 | B2 * | 11/2021 | Shi | B60J 7/198 |
| 11,273,694 | B2 * | 3/2022 | Facchinello | B60P 7/02 |
| 11,465,474 | B2 * | 10/2022 | Schollhammer | B60J 7/068 |
| 11,548,358 | B2 * | 1/2023 | Xia | B60J 7/041 |
| 2018/0118002 | A1 * | 5/2018 | Koengeter | B60J 7/041 |
| 2018/0118007 | A1 * | 5/2018 | Facchinello | B60J 7/198 |
| 2019/0126734 | A1 * | 5/2019 | Dylewski, II | B60J 7/141 |
| 2021/0070156 | A1 * | 3/2021 | Facchinello | B60J 7/0084 |
| 2023/0099236 | A1 * | 3/2023 | Facchinello | B60J 7/0084 296/100.17 |
| 2023/0114568 | A1 * | 4/2023 | Carter | B60J 7/068 296/100.05 |
| 2023/0264548 | A1 * | 8/2023 | Dylewski, II | B60J 7/141 296/100.12 |
| 2023/0331073 | A1 * | 10/2023 | Bernardo | B60J 7/085 |
| 2023/0398847 | A1 * | 12/2023 | Talbert | B60J 7/141 |
| 2024/0294056 | A1 * | 9/2024 | Tam | B60J 7/0573 |
| 2024/0300309 | A1 * | 9/2024 | Copp | B60J 7/141 |

* cited by examiner

PICKUP TRUCK BED ROLLING COVER AND SIDE RAIL STRUCTURE THEREOF

RELATED APPLICATIONS

The present application claims the benefit of priority of Chinese Patent Application No. 202521670909.8, filed on Aug. 6, 2025, and entitled "PICKUP TRUCK BED ROLLING COVER AND SIDE RAIL STRUCTURE THEREOF," the entire content of which is incorporated herein by reference.

TECHNICAL FIELD

The present application relates to the technical field of pickup truck bed rolling covers, and in particular to a pickup truck bed rolling cover and a side rail structure thereof.

BACKGROUND

A rolling cover structure is equipped on a pickup truck bed. The rolling cover structure can be opened and closed by telescoping and adjusting, thereby enabling goods to be placed into or removed from the truck bed. The general rolling cover structure includes a side rail, a cover plate, a roller shutter box, a roller shutter, and a tailgate sheet. The outer side surface of the side rail is a straight structure, while the edge contour of the bed varies among different pickup trucks. After the straight side rail is installed, there is an inconsistent front and rear gap, resulting in different adaptability of the rolling cover structure after installation in different pickup truck beds, and leading to a poor loading visual effect.

SUMMARY

(I) Technical Problem

The purpose of the present application is to provide a pickup truck bed rolling cover and a side rail structure thereof. The outer side surface of the side rail structure used in the existing rolling cover structure is a straight structure. After installation in different types of pickup truck beds, there is an inconsistent front and rear gap, resulting in a poor loading visual effect.

(II) Technical Solution

In order to achieve the above objective, the present application provides the following technical solution:

A side rail structure of a pickup truck bed rolling cover, including a side rail body; specifically, the side rail body includes a profile rail and a single-layer plate extending outward from the profile rail. An outer edge shape of the single-layer plate matches a mounting contour of a pickup truck bed, and a sealing strip is provided at an edge of the single-layer plate.

Preferably, the sealing strip includes a sealing portion provided at the edge of the single-layer plate, and the sealing portion is provided with an outwardly extending and arc-shaped hydrophobic portion.

Preferably, the sealing strip is an integrally formed structure.

Preferably, an end of the profile rail is equipped with an end cover and a water collection tank located below the end cover, and a first waterproof strip located on an inner side is compressed between the end cover and the water collection tank.

Preferably, the single-layer plate is provided at a bottom of the profile rail, or the single-layer plate is provided at a top of the profile rail; and the single-layer plate and the profile rail are an integrally formed structure.

Preferably, the profile rail is provided with a first T-shaped groove located at the top thereof, and a mounting groove on a side away from the single-layer plate.

Preferably, a clamping groove is provided at a top of the mounting groove, and a second waterproof strip is clamped within the clamping groove.

The present application further provides a pickup truck bed rolling cover, including two side rail structures symmetrically provided; specifically, one end of the two side rail structures is provided with a cover plate, and a roller shutter box located below the cover plate is mounted on the side rail structure and the cover plate. A roller shutter is wound in the roller shutter box, and the roller shutter slides relative to the two side rail structures. A tailgate sheet is provided at an end of the roller shutter, and the side rail structure includes a side rail body; specifically, the side rail body includes a profile rail and a single-layer plate extending outward from the profile rail. An outer edge shape of the single-layer plate matches a mounting contour of a pickup truck bed, and a sealing strip is provided at an edge of the single-layer plate.

Preferably, a sealing structure for sealing a connection gap is provided between the side rail structure, the roller shutter box, and the cover plate. A drainage structure is mounted at an end of the side rail structure and is located at an overlap gap between the side rail and the tailgate sheet.

Preferably, the sealing structure includes a sealing plate. The sealing plate includes a first fitting portion fitted to the cover plate, a second fitting portion fitted to an end portion of the side rail structure, and a third fitting portion fitted to the roller shutter box. The first fitting portion, the second fitting portion, and the third fitting portion are connected in sequence, and the second fitting portion is a bending structure.

Preferably, the sealing structure includes a first sealing pad, a first sealing strip, and a second sealing pad. The first sealing pad is arranged between the first fitting portion and the cover plate; the first sealing strip is embedded in a gap between the cover plate and the side rail structure; and the second sealing pad is embedded at a bottom of the side rail structure.

Preferably, the sealing structure includes a second sealing strip. The second sealing strip includes a clamping portion embedded in the cover plate, and a sealing sheet is provided on the clamping portion. A waterproof sheet extending outward and having an arc-shaped structure is provided on the sealing sheet, and the sealing sheet is fitted to the cover plate and the side rail structure.

Preferably, the drainage structure includes an end cover mounted at an end of the side rail structure and a water collection tank located below the end cover, and a first waterproof strip is provided between the end cover and the water collection tank.

Preferably, a second waterproof strip is clamped at a top of a mounting groove of the side rail structure, and an end portion of the second waterproof strip abuts against the roller shutter.

(III) Beneficial Effects

The side rail structure is composed of a profile rail and a single-layer plate. The single-layer plate is used as the outermost part of the entire side rail structure, which facilitates profile processing of the outer edge of the single-layer plate according to the mounting contour of the pickup truck bed. This ensures a consistent front and rear gap after the entire side rail structure is installed on the pickup truck bed, and the overall loading visual effect matches that of the original factory accessories; at the same time, a sealing strip is bonded to an edge of the single-layer plate to achieve sealing and hydrophobicity at an installation position, preventing external rainwater from leaking into the interior of the pickup truck bed from the installation position.

The side rail structures are symmetrically installed in the pickup truck bed rolling cover. After the cover plate, the roller shutter box, the roller shutter, and the tailgate sheet are assembled, a good visual effect of the overall installation can be achieved, which matches the original accessory vision effect, and is adapted to the bed installation of different types of pickup trucks.

BRIEF DESCRIPTION OF THE DRAWINGS

In FIGS. 1 to 13, the relationship between the component names or lines and reference numerals is as follows:

Figure 1:
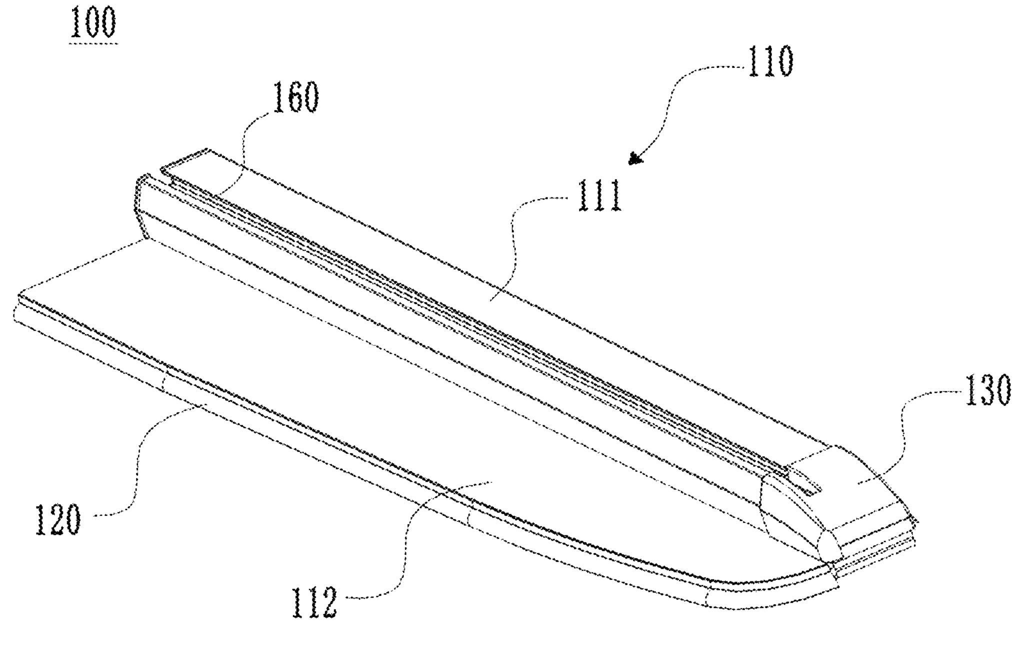
FIG. 1 is a first perspective structural schematic diagram of a first embodiment of the side rail structure according to the present application.
Figure 2:
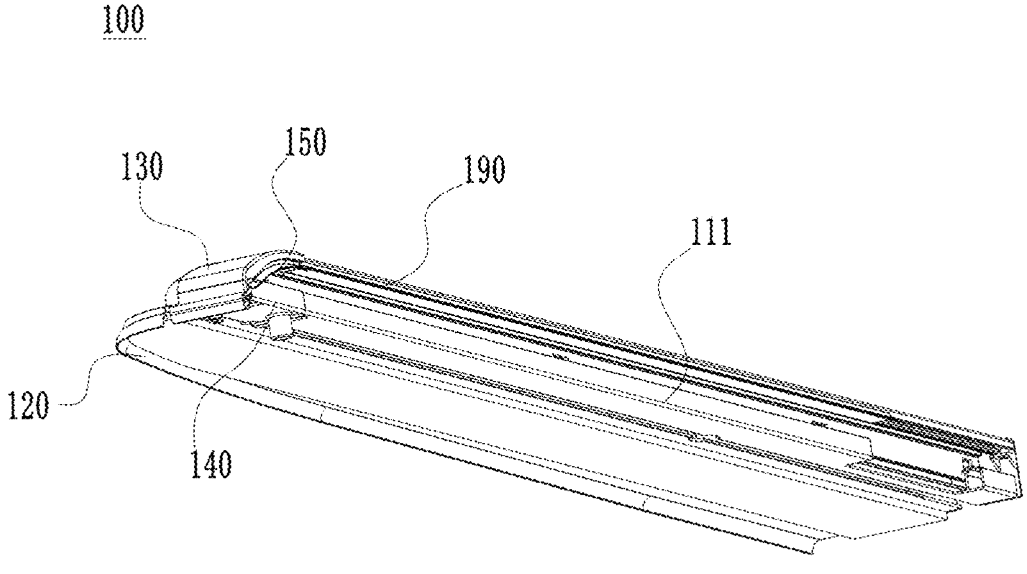
FIG. 2 is a second perspective structural schematic diagram of a first embodiment of the side rail structure according to the present application.
Figure 3:
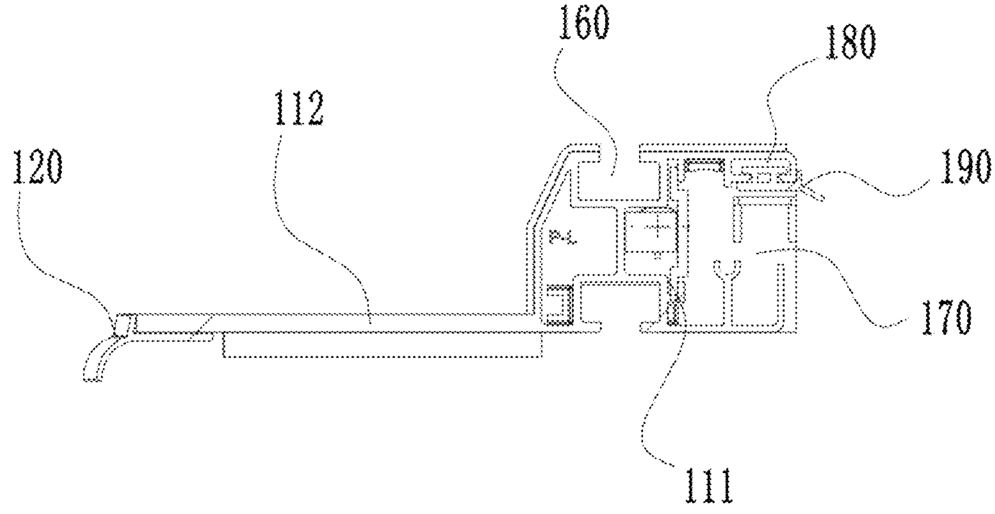
FIG. 3 is a cross-sectional structural schematic diagram of a first embodiment of the side rail structure according to the present application.

Side rail structure 100, side rail body 110, profile rail 111, single-layer plate 112, sealing strip 120, sealing portion 121, hydrophobic portion 122, end cover 130, water collection tank 140, first waterproof strip 150, first T-shaped groove 160, mounting groove 170, clamping groove 180, second waterproof strip 190, pickup truck bed rolling cover 200, cover plate 210, roller shutter box 220, roller shutter 230, tailgate sheet 240, sealing structure 250, sealing plate 251, first fitting portion 2511, second fitting portion 2512, third fitting portion 2513, first sealing pad 252, first sealing strip 253, second sealing pad 254, second sealing strip 255, clamping portion 2551, sealing sheet 2252, waterproof sheet 2253, and drainage structure 260.

DETAILED DESCRIPTION

The technical solutions in the embodiments of the present application will be explicitly and completely described below with reference to the drawings in the embodiments of the present application. Obviously, the embodiments described are only a part of, not all, the embodiments of the present application.

As shown in FIG. 1, FIG. 2, FIG. 3, FIG. 5, FIG. 6, and FIG. 7, an embodiment of the present application proposes a side rail structure 100 of a pickup truck bed rolling cover 200, including a side rail body 110, and the side rail body 110 includes a profile rail 111 and a single-layer plate 112 extending outward from the profile rail 111; specifically, the material of the single-layer plate 112 can be the same as or different from that of the profile rail 111. Materials such as aluminum plates and steel plates can be used as long as the corresponding structural strength is met; and an outer edge shape of the single-layer plate 112 matches a mounting contour of a pickup truck bed, and a sealing strip 120 is provided at an edge of the single-layer plate 112. The side rail structure 100 is configured to form the supporting structure on both sides of the pickup truck bed rolling cover 200 and is installed in the pickup truck bed. The profile rail 111 is configured to install structures such as a roller shutter 230, while the single-layer plate 112 is configured to fit against an edge of the pickup truck bed. Using the single-layer plate 112 is convenient for processing its edge. According to different types of pickup truck bed contour structures, the outer edge of the single-layer plate 112 is processed accordingly. As such, in the installed state, there is a consistent gap between the front and rear ends of the entire side rail structure 100 and the pickup truck bed contour. The overall visual effect is the same as the installation of original factory accessories. At the same time, by maintaining a consistent gap size, the sealing effect at the installation position can be ensured. Further, by providing the sealing strip 120 on the edge of the single-layer plate 112, reliable sealing of a gap is achieved in the installed state, preventing external rainwater from leaking into the interior of the pickup truck bed from the installation position.

Figure 4:
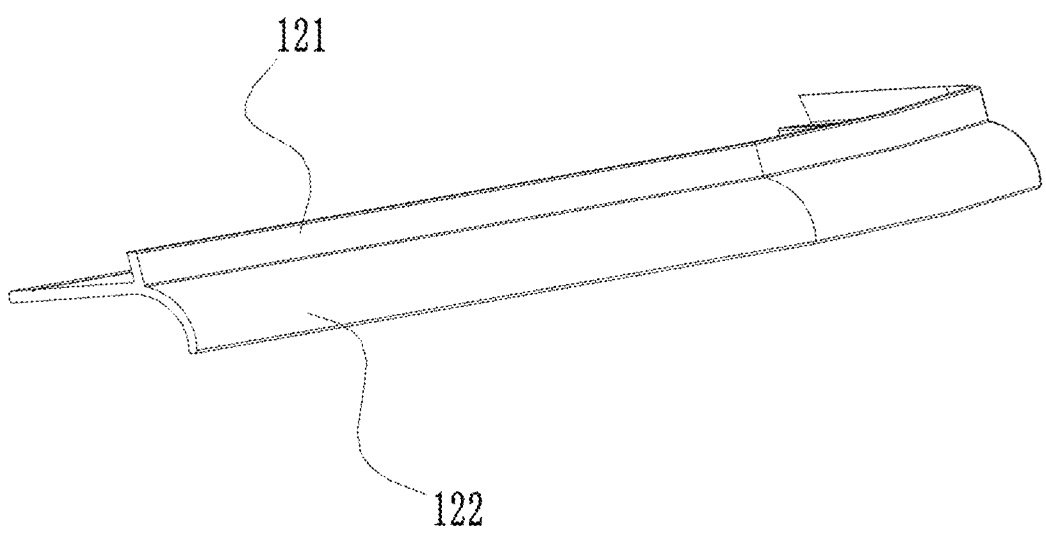
FIG. 4 is a structural schematic diagram of a sealing strip according to the present application.
Figure 5:
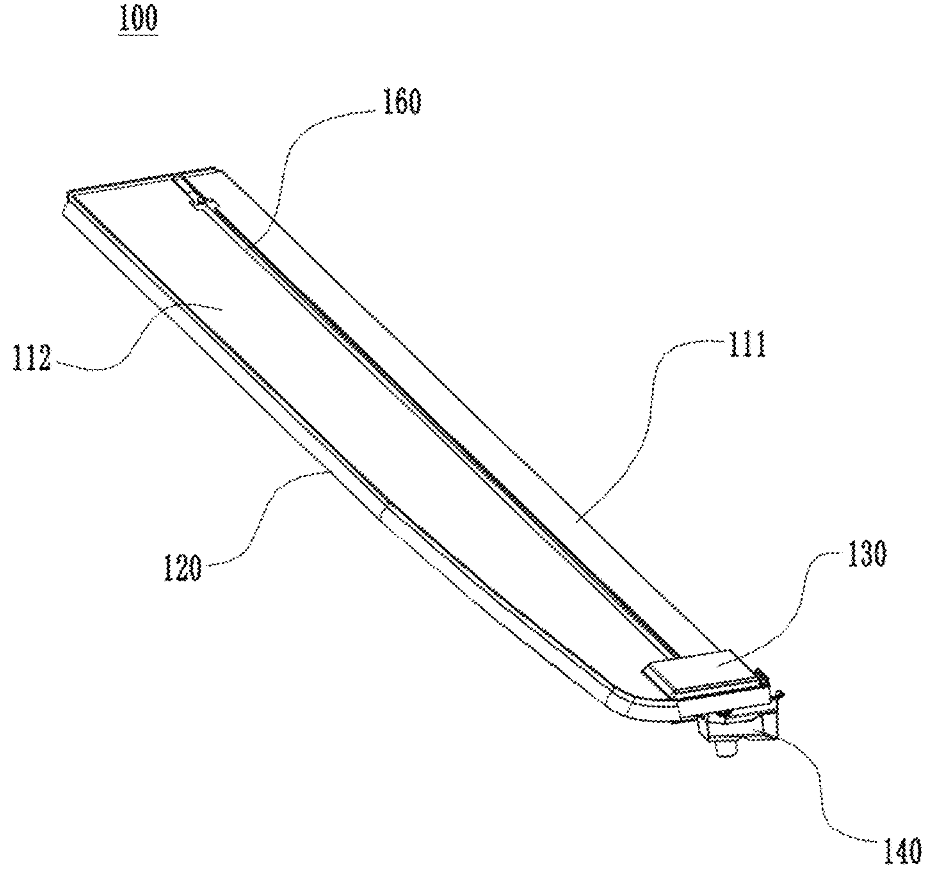
FIG. 5 is a first perspective structural schematic diagram of a second embodiment of the side rail structure according to the present application.
Figure 6:
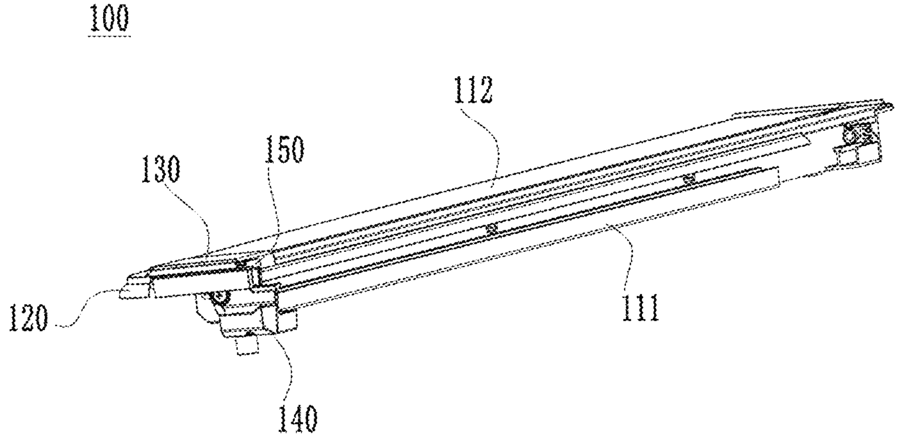
FIG. 6 is a second perspective structural schematic diagram of a second embodiment of the side rail structure according to the present application.
Figure 7:
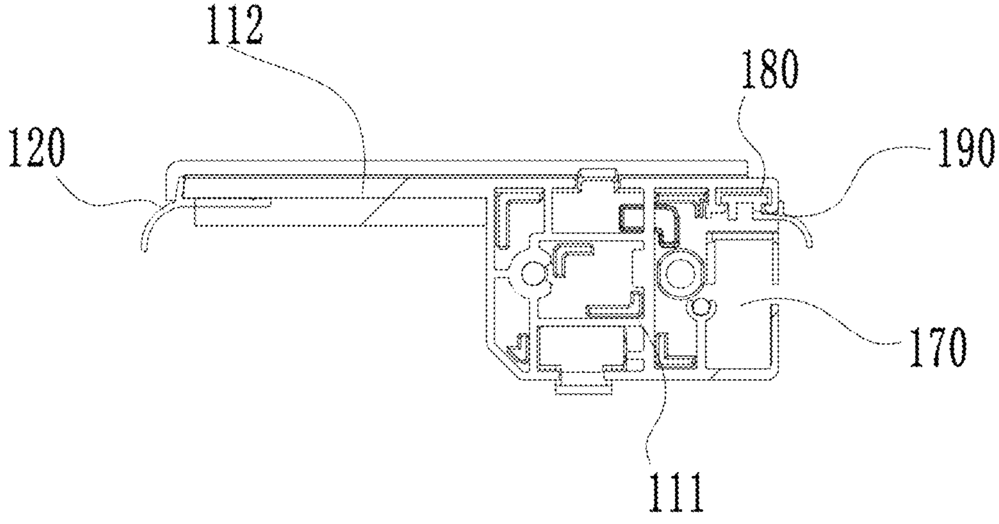
FIG. 7 is a cross-sectional structural schematic diagram of a second embodiment of the side rail structure according to the present application.
Figure 8:
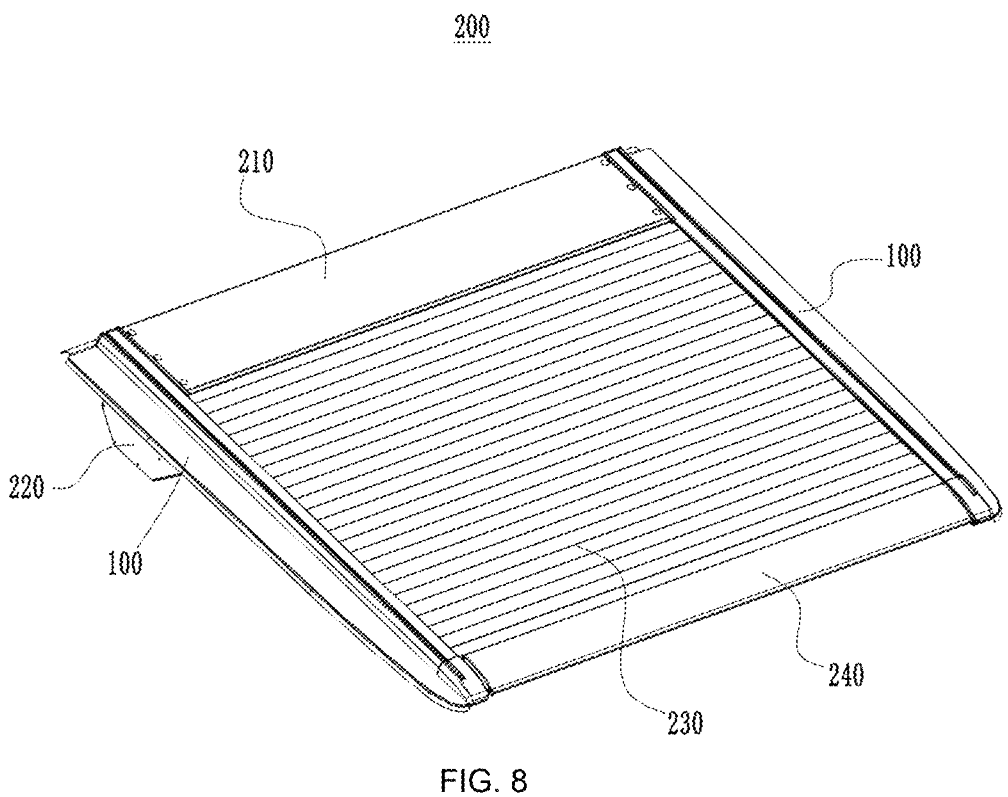
FIG. 8 is a first perspective structural schematic diagram of a first embodiment of the pickup truck bed rolling cover according to the present application.
Figure 9:
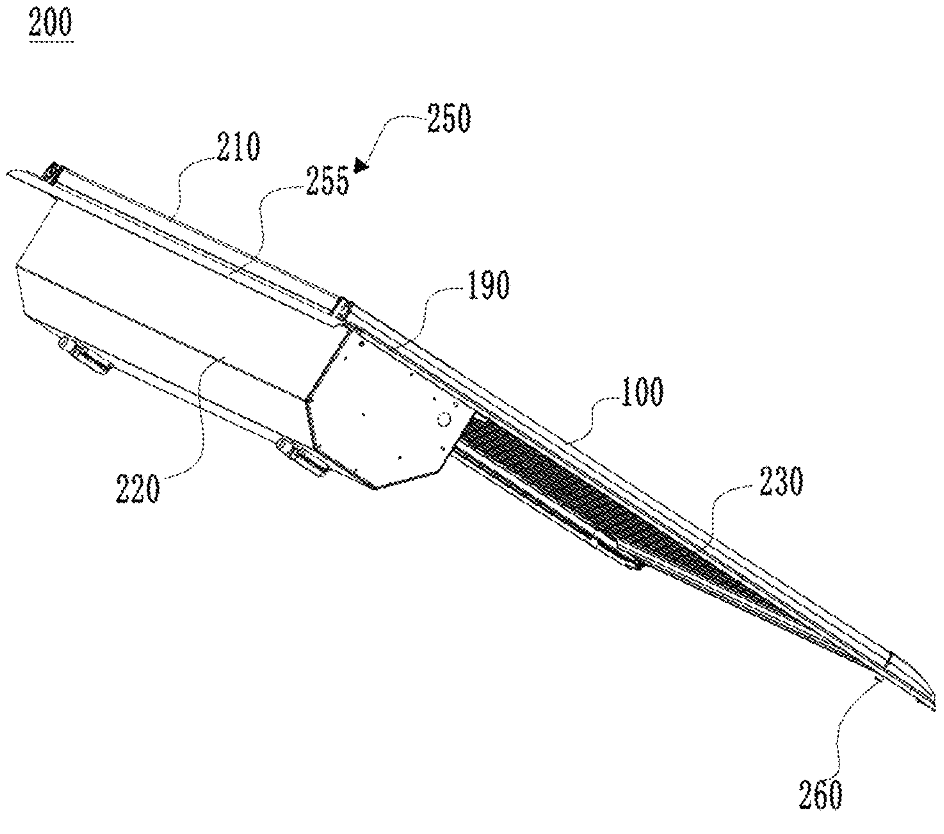
FIG. 9 is a second perspective structural schematic diagram of a first embodiment of the pickup truck bed rolling cover according to the present application.

Further, the sealing strip 120 needs to achieve both longitudinal and transverse sealing and waterproofing at the installation position. Therefore, as shown in FIG. 4, the sealing strip 120 includes a sealing portion 121 provided at the edge of the single-layer plate 112, and the sealing portion 121 is provided with an outwardly extending and arc-shaped hydrophobic portion 122. The edge position of the single-layer plate 112 is fully covered by the L-shaped sealing portion 121, so that effective sealing at the installation position is achieved. Moreover, water is guided outward through the hydrophobic portion 122, reducing the amount of water remaining at the sealing position, and thereby ensuring good waterproof performance. It should be noted that the structural form of the sealing portion 121 can be other shapes in addition to being L-shaped, as long as the shape is suitable for assembly at the edge of the single-layer plate 112. The sealing portion 121 can be assembled to the single-layer plate 112 by various methods such as bonding, clamping connection, screw fastening, or by providing a slot on the single-layer plate 112 to clamp the sealing portion 121. Specifically, the method can be one that is convenient for operation in an actual application scenario, as long as it ensures that the sealing portion 121 does not fall off relative to the single-layer plate 112. An appropriate connection method is selected according to a corresponding scenario to facilitate assembly operations.

Further, in order to ensure the integrity of the sealing strip 120 and facilitate molding processing, the sealing strip 120 is an integrally formed structure made of materials such as silicone or rubber, which can be processed in batches by mold forming.

In addition, an end of the profile rail 111 is equipped with an end cover 130 and a water collection tank 140 located below the end cover 130. The installation and maintenance of the water collection tank 140 is realized through the end cover 130. The end cover 130 also facilitates the operation when the roller shutter 230 is installed on the profile rail 111. Moreover, the end cover 130 forms protection at a limit and a joint. The water collection tank 140 collects water flowing down at the joint and discharges it outward, thereby preventing the risk of water accumulation. In addition, a first waterproof strip 150 located on an inner side is compressed between the end cover 130 and the water collection tank 140. The sealing of the joint is achieved by the first waterproof strip 150, particularly providing waterproofing at the position where the roller shutter 230 moves to the end cover 130.

According to different types of pickup truck bed rolling covers 200, the specific installation forms vary, but all meet profile processing at an edge position. Specifically, in one embodiment, the single-layer plate 112 is arranged at the bottom of the profile rail 111 and has an L-shaped structure as a whole. In another embodiment, the single-layer plate 112 is arranged on the top of the profile rail 111, the whole having an inverted L-shaped structure, so as to adapt to different types of bed structures.

Specifically, the single-layer plate 112 and the profile rail 111 can be a split structure or an integrally formed structure, in which the integrally formed structure can ensure the structural strength of the entire side rail structure and provide better overall structural consistency. However, in an actual application scenario, a split structure can also be used. The single-layer plate 112 can extend outward from the profile rail 111, so that the single-layer plate 112 is detachably connected to a side facing the profile rail 111. The single-layer plate 112 or other structures are profiled separately and installed on the profile rail 111 to form a side rail structure. Therefore, in the side rail structure formed through profile processing, the single-layer plate 112 and the profile rail 111 can be an integrally formed structure, and can also be a split detachable structure. In particular, in the split detachable structure, it is also possible to consider adapting the existing side rail structure.

In addition, the profile rail 111 is provided with a first T-shaped groove located at the top thereof and a mounting groove 170 on a side away from the single-layer plate 112; specifically, the mounting groove 170 is configured to install the roller shutter 230 and allows that the roller shutter 230 can slide relative to each other, and the first T-shaped groove is configured for expansion connection, such as inserting a T-bolt to realize expansion connection.

In addition, a clamping groove 180 is provided at the top of the mounting groove 170, and a second waterproof strip 190 is clamped within the clamping groove 180. The second waterproof strip 190 is configured to seal the sliding roller shutter 230. The specific structural form can be designed according to the structure of the roller shutter 230.

Based on the above embodiment, a pickup truck bed rolling cover 200 is proposed, as shown in FIG. 8, FIG. 9, FIG. 11, and FIG. 12, including two symmetrically provided side rail structures 100, one end of the two side rail structures 100 is provided with a cover plate 210, and a roller shutter box 220 located below the cover plate 210 is mounted on the side rail structure 100 and the cover plate 210. A roller shutter 230 is wound in the roller shutter box 220, and the roller shutter 230 slides relative to the two side rail structures 100. A tailgate sheet 240 is provided at an end of the roller shutter 230. After the cover plate 210 is fixedly installed by the side rail structure 100, a frame structure is formed. The roller shutter box 220 is configured to install the winding mechanism to realize the winding control of the roller shutter 230, and the roller shutter 230 is slidably installed on the two side rail structures 100, so as to realize the opening or closing of the cover of roller shutter 230. The tailgate sheet 240 also slides with the side rail structure 100 to form a stable support at an end portion, so as to ensure the stability of the overall structure. Specifically, the side rail structure 100 includes a side rail body 110, and the side rail body 110 includes a profile rail 111 and a single-layer plate 112 extending outward from the profile rail 111. An outer edge shape of the single-layer plate 112 matches the mounting contour of a pickup truck bed, and a sealing strip 120 is provided at an edge of the single-layer plate 112. Using the single-layer plate 112 is convenient for processing its edge. According to different types of pickup truck bed contour structures, the outer edge of the single-layer plate 112 is processed accordingly. As such, in the installed state, there is a consistent gap between the front and rear ends of the entire side rail structure 100 and the pickup truck bed contour. The overall visual effect is the same as the installation of original factory accessories. At the same time, by maintaining a consistent gap size, the sealing effect at the installation position can be ensured. Further, by providing the sealing strip 120 on the edge of the single-layer plate 112, reliable sealing of a gap is achieved in the installed state, preventing external rainwater from leaking into the interior of the pickup truck bed from the installation position.

Specifically, the single-layer plate 112 and the profile rail 111 can be a split structure or an integrally formed structure, in which the integrally formed structure can ensure the structural strength of the entire side rail structure and provide better overall structural consistency. However, in an actual application scenario, a split structure can also be used. The single-layer plate 112 can extend outward from the profile rail 111, so that the single-layer plate 112 is detachably connected to a side facing the profile rail 111. The single-layer plate 112 or other structures are profiled separately and installed on the profile rail 111 to form a side rail structure. Therefore, in the side rail structure formed through profile processing, the single-layer plate 112 and the profile rail 111 can be an integrally formed structure, and can also be a split detachable structure. In particular, in the split detachable structure, it is also possible to consider adapting the existing side rail structure.

The sealing strip can be connected by various methods such as bonding, clamping connection, screw fastening, or slot clamping connection, and the most stable connection method in an application scenario can be considered. Specifically, for connection with the side rail structure, the methods mentioned in the above embodiment can be adopted.

Other parts of the side rail structure 100 can adopt the methods mentioned in the above embodiment, and can also adopt other design structures according to the structural form of the pickup truck bed rolling cover 200.

In order to ensure the waterproof performance of the entire pickup truck bed rolling cover 200, in addition to sealing and waterproofing at the installation position of the side rail structure 100, it is also necessary to improve the waterproof performance of the roller shutter 230 cover itself. Specifically, a sealing structure 250 for sealing a connection gap is provided between the side rail structure 100, the roller shutter box 220, and the cover plate 210. A drainage structure 260 is mounted at an end of the side rail structure 100 and is located at an overlap gap between the side rail and the tailgate sheet 240. The sealing structure 250 realizes the sealing of a joint, and the drainage structure 260 is configured to quickly drain accumulated water, avoiding excessive water accumulation that leaks into the pickup truck bed when the roller shutter 230 is in action.

The sealing structure 250 has various embodiments, and different sealing structures 250 can be adopted depending on the structural form of the roller shutter 230.

Figure 13:
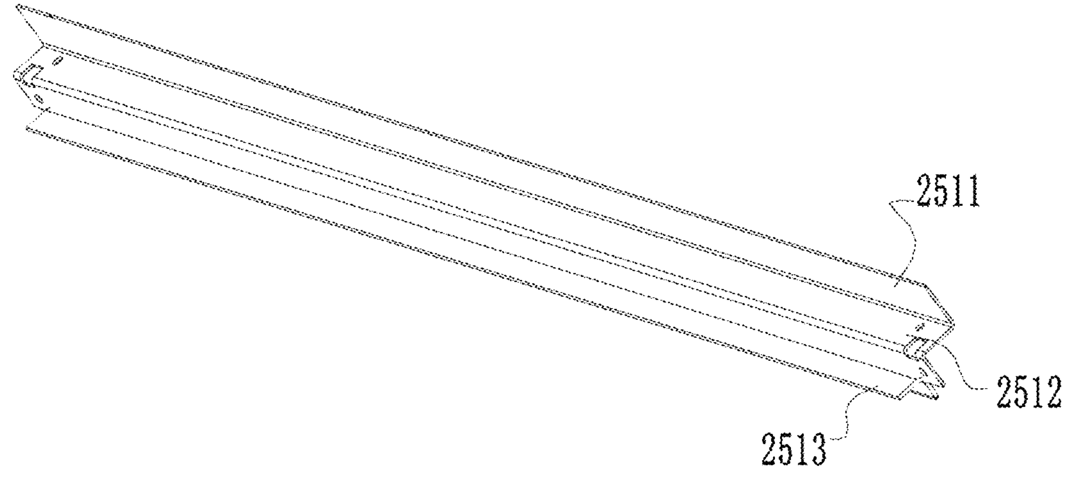
FIG. 13 is a structural schematic diagram of a sealing plate according to the present application.

In one of the covers of the roller shutter 230, the sealing structure 250 includes a sealing plate 251. As shown in FIG. 13, the sealing plate 251 includes a first fitting portion 2511 fitted to the cover plate 210, a second fitting portion 2512 fitted to an end portion of the side rail structure 100, and a third fitting portion 2513 fitted to the roller shutter box 220. The first fitting portion 2511, the second fitting portion 2512, and the third fitting portion 2513 are connected in sequence, and the second fitting portion 2512 is a bending structure. The adjacent connection positions are sealed by the first fitting portion 2511, the second fitting portion 2512, and the third fitting portion 2513, and the flow is directed outward without entering inward. In addition, the sealing structure 250 includes a first sealing pad 252, a first sealing strip 253, and a second sealing pad 254. The first sealing pad 252 is arranged between the first fitting portion 2511 and the cover plate 210; the first sealing strip 253 is embedded in a gap between the cover plate 210 and the side rail structure 100; and the second sealing pad 254 is embedded at a bottom of the side rail structure 100. The first sealing pad 252 is pressed by the sealing plate 251 to seal the edge position, while the first sealing strip 253 further seals the connection position between the cover plate 210 and the side rail structure 100. The second sealing pad 254 performs end-face sealing when the side rail structure 100 is installed on the pickup truck bed, and realizes comprehensive sealing of the installation position in conjunction with the function of the sealing strip 120 to improve the waterproof performance.

Figure 10:
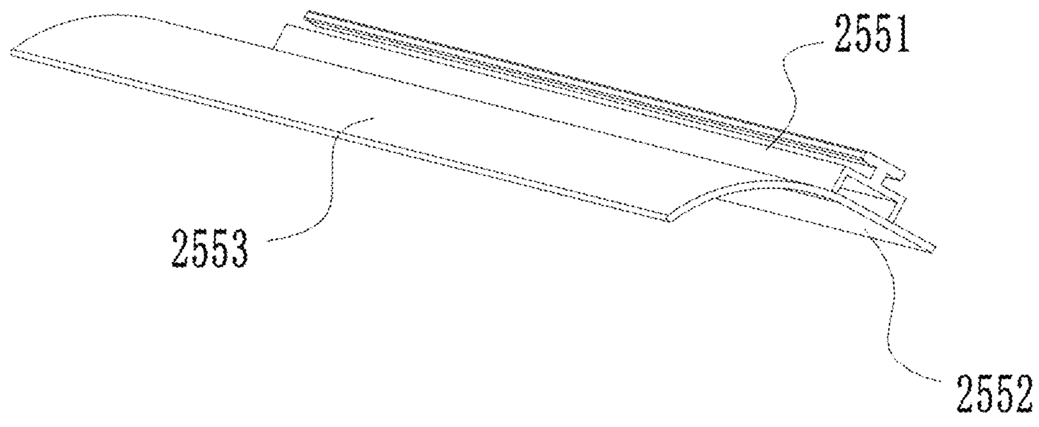
FIG. 10 is a structural schematic diagram of a second sealing strip according to the present application.
Figure 11:
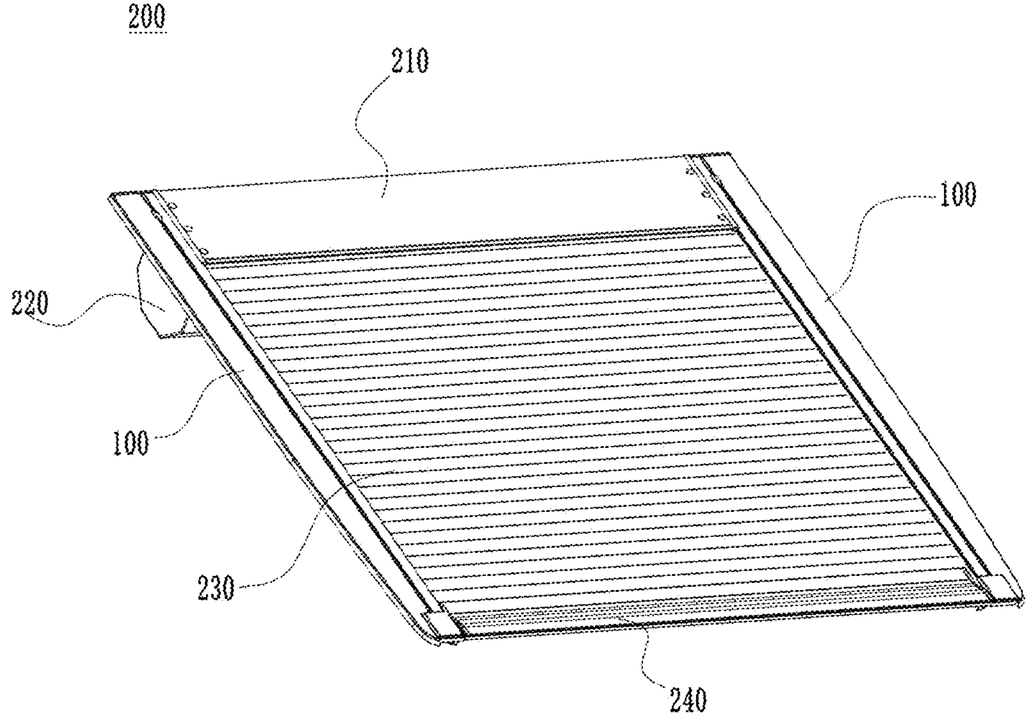
FIG. 11 is a first perspective structural schematic diagram of a second embodiment of the pickup truck bed rolling cover according to the present application.
Figure 12:
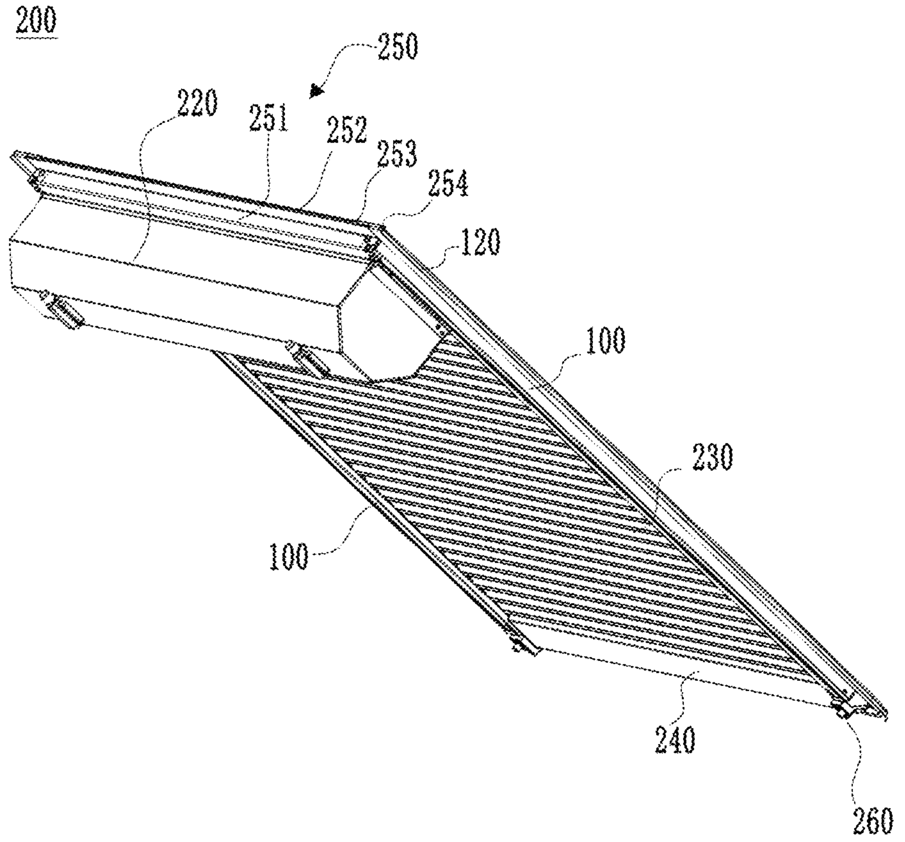
FIG. 12 is a second perspective structural schematic diagram of a second embodiment of the pickup truck bed rolling cover according to the present application.

In another structural form of the pickup truck bed rolling cover 200, the sealing structure 250 includes a second sealing strip 255. As shown in FIG. 10, the second sealing strip 255 includes a clamping portion 2551 embedded in the cover plate 210, and a sealing sheet 2252 is provided on the clamping portion 2551. A waterproof sheet 2253 extending outward and having an arc-shaped structure is provided on the sealing sheet 2252, and the sealing sheet 2252 is fitted to the cover plate 210 and the side rail structure 100. The entire second sealing strip 255 is clamped by the clamping portion 2551, while the sealing sheet 2252 is configured to fit on the cover plate 210 to achieve end-face sealing, and the waterproof sheet 2253 extends outward, and in the installed state, water is discharged to the outside of the pickup truck bed, thereby avoiding water accumulation at the seal. In this way, the first sealing strip 253 and the second sealing pad 254 can still be installed at a corresponding position to achieve sealing, and the above structure can be adopted.

Specifically, the drainage structure 260 includes an end cover 130 mounted at an end of the side rail structure 100 and a water collection tank 140 located below the end cover 130. A first waterproof strip 150 is provided between the end cover 130 and the water collection tank 140. The position of the water collection tank 140 is blocked by the end cover 130, while the tailgate sheet 240 can move relatively at this location. Accumulated water is collected through the water collection tank 140 and discharged outward to prevent excessive residual water from remaining, which could otherwise flow into the pickup truck bed when the roller shutter 230 is opened. At the same time, the sliding position of the tailgate sheet 240 is sealed accordingly by the first waterproof strip 150.

Further, a second waterproof strip 190 is clamped at a top of a mounting groove 170 of the side rail structure 100, and an end portion of the second waterproof strip 190 abuts against the roller shutter 230. Waterproofing during the movement of the roller shutter 230 is achieved by the second waterproof strip 190, so that water can flow from the surface of the roller shutter 230 to the water collection tank 140 as much as possible and then be discharged outward.

Thus, the entire pickup truck bed rolling cover 200 achieves an overall vision effect that meets the original factory accessory requirements after being installed on the pickup bed, and provides good waterproof protection for the interior of the pickup truck bed.

In the present application, unless otherwise specified or restricted, the terms of “mount”, “be connected to”, “be connected with”, and “fix” shall be understood as a general sense. For example, the connection can be fixed connection, removable connection, integrated connection, mechanical connection, electrical connection, direct connection, indirect connection through intermediate media, connection between two components or interaction between two components. For those of ordinary skill in the art, understanding of the specific meanings of the above terms in the present application can be acquired according to specific situations.

In the description of the present application, it needs to be noted that the azimuth or position relationships indicated by the terms “center”, “upper”, “lower”, “left”, “right”, “inside” and “outside” are based on those shown in the drawings, or those in which a product of the present application is usually placed when used. It is only for convenience of description and simplification of the present application, not to indicate or imply that the referred devices or components must have a specific orientation, be constructed and operate in a specific orientation. Therefore, the content should not be understood as limiting the scope of the present application. Furthermore, the terms “first”, “second”, and the like are used merely for descriptive purposes and should not be interpreted as indicating or implying relative importance.

It is obvious to those skilled in the art that the present application is not limited to the details of the above exemplary embodiment, and can be implemented in other specific forms without departing from the spirit or basic features of the present application. Therefore, no matter from which point of view, the embodiment should be regarded as exemplary and non-limiting. The scope of the present application is defined by the claims rather than the above description, so it is intended to include all changes that fall within the meaning and scope of the equivalent elements of the claims in the present application. Any reference numerals in the claims should not be regarded as limiting the claims involved.

What is claimed is:

1. A side rail structure of a pickup truck bed rolling cover, comprising a side rail body, wherein the side rail body comprises a profile rail and a single-layer plate extending outward from the profile rail, wherein the single-layer plate has an L-shaped structure as a whole, and the single-layer plate facilitates profile processing of an outer edge of the single-layer plate according to a mounting contour of a pickup truck bed to ensure a consistent front and rear gap after the side rail structure is installed on the pickup truck bed, and a sealing strip is provided at an edge of the single-layer plate; wherein the single-layer plate is provided at a bottom of the profile rail, and the single-layer plate and the profile rail are an integrally formed structure; wherein the profile rail is provided with a first T-shaped groove located at a top thereof, and a mounting groove located on a side away from the single-layer plate; and wherein the sealing strip includes an L-shaped sealing portion, and the edge position of the single-layer plate is fully covered by the L-shaped sealing portion, and the L-shaped sealing portion is provided with an outwardly extending and arc-shaped hydrophobic portion configured to guide water outward and reduce water accumulation at the sealing position; and wherein an end of the profile rail is provided with an end cover and a water collection tank located below the end cover, and a first waterproof strip located on an inner side is compressed between the end cover and the water collection tank.

2. The side rail structure of a pickup truck bed rolling cover according to claim 1, wherein the sealing strip is an integrally formed structure.

3. The side rail structure of a pickup truck bed rolling cover according to claim 1, wherein a clamping groove is provided at a top of the mounting groove, and a second waterproof strip is clamped within the clamping groove.

4. A pickup truck bed rolling cover, comprising two side rail structures symmetrically provided, wherein one end of the two side rail structures is provided with a cover plate, a roller shutter box located below the cover plate is mounted on the side rail structure and the cover plate, a roller shutter is wound in the roller shutter box, the roller shutter slides relative to the two side rail structures, and a tailgate sheet is provided at an end of the roller shutter; and the side rail structure comprises a side rail body, the side rail body comprises a profile rail and a single-layer plate extending outward from the profile rail, wherein the single-layer plate has an L-shaped structure as a whole, and the single-layer plate facilitates profile processing of an outer edge of the single-layer plate according to a mounting contour of a pickup truck bed to ensure a consistent front and rear gap after the side rail structure is installed on the pickup truck bed, and a sealing strip is provided at an edge of the single-layer plate; wherein the single-layer plate is provided at a bottom of the profile rail, and the single-layer plate and the profile rail are an integrally formed structure; wherein the profile rail is provided with a first T-shaped groove located at a top thereof, and a mounting groove located on a side away from the single-layer plate; and wherein the sealing strip includes an L-shaped sealing portion, and the edge position of the single-layer plate is fully covered by the L-shaped sealing portion, and the L-shaped sealing portion is provided with an outwardly extending and arc-shaped hydrophobic portion configured to guide water outward and reduce water accumulation at the sealing position; and wherein an end of the profile rail is provided with an end cover and a water collection tank located below the end cover, and a first waterproof strip located on an inner side is compressed between the end cover and the water collection tank.

5. The pickup truck bed rolling cover according to claim 4, wherein a sealing structure for sealing a connection gap is provided between the side rail structure, the roller shutter box, and the cover plate, and a drainage structure is mounted at an end of the side rail structure and is located at an overlap gap between the side rail and the tailgate sheet.

6. The pickup truck bed rolling cover according to claim 5, wherein the sealing structure comprises a sealing plate, the sealing plate comprises a first fitting portion fitted to the cover plate, a second fitting portion fitted to an end portion of the side rail structure, and a third fitting portion fitted to the roller shutter box, the first fitting portion, the second fitting portion, and the third fitting portion are connected in sequence, and the second fitting portion is a bending structure.

7. The pickup truck bed rolling cover according to claim 6, wherein the sealing structure comprises a first sealing pad, a first sealing strip, and a second sealing pad, and the first sealing pad is arranged between the first fitting portion and the cover plate, the first sealing strip is embedded in a gap between the cover plate and the side rail structure, and the second sealing pad is embedded at a bottom of the side rail structure.

8. The pickup truck bed rolling cover according to claim 5, wherein the sealing structure comprises a second sealing strip, the second sealing strip comprises a clamping portion embedded in the cover plate, a sealing sheet is provided on the clamping portion, a waterproof sheet extending outward and having an arc-shaped structure is provided on the sealing sheet, and the sealing sheet is fitted to the cover plate and the side rail structure.

9. The pickup truck bed rolling cover according to claim 5, wherein the drainage structure comprises an end cover mounted at an end of the side rail structure and a water collection tank located below the end cover, and a first waterproof strip is provided between the end cover and the water collection tank.

10. The pickup truck bed rolling cover according to claim 9, wherein a second waterproof strip is clamped at a top of a mounting groove of the side rail structure, and an end portion of the second waterproof strip abuts against the roller shutter.

* * * * *